(12) United States Patent
Maze (10) Patent No.: US 9,552,369 B2
(45) Date of Patent: Jan. 24, 2017

(54) DOCUMENT MANAGEMENT SYSTEMS AND METHODS

(71) Applicant: Gary Robin Maze, Broomfield, CO (US)

(72) Inventor: Gary Robin Maze, Broomfield, CO (US)

(*) Notice: Subject to any disclaimer, the term of this patent is extended or adjusted under 35 U.S.C. 154(b) by 158 days.

(21) Appl. No.: 14/547,001

(22) Filed: Nov. 18, 2014

(65) Prior Publication Data

US 2015/0081635 A1    Mar. 19, 2015

Related U.S. Application Data

(63) Continuation of application No. 13/646,541, filed on Oct. 5, 2012, now Pat. No. 8,924,443.

(51) Int. Cl.
*G06F 17/30* (2006.01)
*H04L 29/06* (2006.01)

(52) U.S. Cl.
CPC ..... *G06F 17/3023* (2013.01); *G06F 17/30194* (2013.01); *G06F 17/30203* (2013.01); *G06F 17/30345* (2013.01); *H04L 63/10* (2013.01)

(58) Field of Classification Search
CPC ............ G06F 17/3023; G06F 17/30345; G06F 17/30203; G06F 17/30194; H04L 63/10
USPC ......................................................... 707/827
See application file for complete search history.

(56) References Cited

U.S. PATENT DOCUMENTS

| | | | | |
|---|---|---|---|---|
| 5,485,369 A * | 1/1996 | Nicholls | .......... | G06Q 10/06311 700/99 |
| 5,557,721 A * | 9/1996 | Fite | .................... | G06K 17/0022 705/14.1 |
| 5,724,578 A * | 3/1998 | Morinaga | ......... | G06F 17/30067 |
| 5,778,384 A * | 7/1998 | Provino | ............ | G06F 17/30233 |
| 5,784,628 A * | 7/1998 | Reneris | ................. | G06F 1/3215 713/300 |
| 5,805,809 A * | 9/1998 | Singh | .................. | G06F 12/0813 707/E17.01 |
| 5,956,715 A * | 9/1999 | Glasser | ............. | G06F 17/30221 |
| 6,012,151 A * | 1/2000 | Mano | ................... | G06F 11/2033 710/19 |
| 6,018,745 A * | 1/2000 | Kuftedjian | ........ | G06F 17/30106 707/827 |
| 6,112,196 A * | 8/2000 | Zimowski | ............. | G06F 9/5033 |
| 6,219,669 B1 * | 4/2001 | Haff | ........................ | H04L 29/06 |
| 6,477,544 B1 * | 11/2002 | Bolosky | ............. | G06F 17/3015 |
| 6,856,989 B1 * | 2/2005 | Zhou | ................. | G06F 17/30893 |
| 7,328,225 B1 * | 2/2008 | Beloussov | ........ | G06F 17/30067 |

(Continued)

FOREIGN PATENT DOCUMENTS

JP    2005222305 A *  8/2005   ............ G06F 12/14

*Primary Examiner* — Phuong Thao Cao
(74) *Attorney, Agent, or Firm* — Maze IP Law, PC (57) ABSTRACT

A system for managing files over a network comprises a first computer hosting managed folders and files and one or more second computers. The first computer comprises database management software, server software such as server pipe software, and a first unique token. The second computer comprises a software module adapted and configured to be integrated into application software, client software such as client pipe software, and a second unique token. The computers communicate in part using the server and client software to establish a secure session for file access and transfer between the first and second computers.

19 Claims, 4 Drawing Sheets

(56) References Cited

U.S. PATENT DOCUMENTS

| | | | | |
|---|---|---|---|---|
| 7,685,375 B2* | 3/2010 | Narayanaswami | G06F 21/6218 | 711/152 |
| 7,774,391 B1* | 8/2010 | Le | G06F 17/30091 | 707/822 |
| 7,917,604 B1* | 3/2011 | Gruttadauria | G06F 17/30873 | 707/762 |
| 8,122,070 B1* | 2/2012 | Eshkenazi | G06F 17/30203 | 707/822 |
| 8,413,203 B2* | 4/2013 | Kawana | H04N 5/44543 | 725/131 |
| 8,453,141 B1* | 5/2013 | Poole | G06F 8/68 | 717/169 |
| 8,484,242 B1* | 7/2013 | Singh | G06F 17/30442 | 707/770 |
| 8,762,433 B1* | 6/2014 | Lam | G06F 17/3023 | 707/638 |
| 9,098,565 B1* | 8/2015 | Kumarjiguda | G06F 17/30604 | |
| 9,231,949 B1* | 1/2016 | Jenkins | H04L 63/0807 | |
| 2001/0044805 A1* | 11/2001 | Multer | G06F 17/30194 | |
| 2002/0035697 A1* | 3/2002 | McCurdy | G06F 17/30011 | 726/3 |
| 2002/0091772 A1* | 7/2002 | Yong | G06Q 10/107 | 709/206 |
| 2002/0107661 A1* | 8/2002 | Ainlay | G01G 19/00 | 702/174 |
| 2002/0174010 A1* | 11/2002 | Rice, III | G06F 17/30194 | 705/14.67 |
| 2002/0194522 A1* | 12/2002 | Mishima | G06F 11/3423 | 714/1 |
| 2003/0014328 A1* | 1/2003 | Lindner | G06Q 20/204 | 705/26.2 |
| 2003/0031457 A1* | 2/2003 | Miomo | G06F 17/3028 | 386/224 |
| 2003/0158816 A1* | 8/2003 | Rouse | G06Q 30/06 | 705/51 |
| 2003/0187853 A1* | 10/2003 | Hensley | G06Q 10/10 | |
| 2003/0231207 A1* | 12/2003 | Huang | H04L 51/12 | 715/752 |
| 2004/0122692 A1* | 6/2004 | Irving | G06Q 50/205 | 709/225 |
| 2004/0133544 A1* | 7/2004 | Kiessig | G06F 17/30067 | |
| 2004/0148351 A1* | 7/2004 | Cotte | H04L 29/06027 | 709/205 |
| 2004/0199463 A1* | 10/2004 | Deggendorf | G06Q 20/10 | 705/39 |
| 2005/0165734 A1* | 7/2005 | Vicars | G06F 17/30011 | |
| 2005/0216469 A1* | 9/2005 | Saito | G06F 17/30067 | |
| 2005/0238047 A1* | 10/2005 | Holland | H04W 48/18 | 370/465 |
| 2006/0095831 A1* | 5/2006 | Kawada | H04N 1/32117 | 715/255 |
| 2006/0117010 A1* | 6/2006 | Hakala | G06F 17/30165 | |
| 2006/0117063 A1* | 6/2006 | Havewala | G06F 21/6218 | |
| 2006/0200498 A1* | 9/2006 | Galipeau | G06F 17/30315 | |
| 2006/0200637 A1* | 9/2006 | Galipeau | G06F 11/2097 | 711/162 |
| 2006/0248578 A1* | 11/2006 | Denton | G06F 21/31 | 726/5 |
| 2006/0274367 A1* | 12/2006 | Yamamoto | G06F 3/1204 | 358/1.15 |
| 2006/0277229 A1* | 12/2006 | Yoshida | G06F 17/30011 | |
| 2007/0124415 A1* | 5/2007 | Lev-Ran | H04L 12/583 | 709/217 |
| 2007/0130157 A1* | 6/2007 | Jain | G06F 17/30504 | |
| 2007/0130166 A1* | 6/2007 | Takahashi | G06F 17/30011 | |
| 2007/0156897 A1* | 7/2007 | Lim | H04L 63/20 | 709/225 |
| 2007/0157203 A1* | 7/2007 | Lim | G06F 9/468 | 718/100 |
| 2007/0192702 A1* | 8/2007 | Takano | G06F 17/30011 | 715/733 |
| 2007/0220068 A1* | 9/2007 | Thompson | G06F 17/3023 | |
| 2007/0226174 A1* | 9/2007 | Saito | G06F 21/6227 | |
| 2007/0233647 A1* | 10/2007 | Rawat | G06F 21/6218 | |
| 2008/0022373 A1* | 1/2008 | Takahashi | G06F 21/6209 | 726/4 |
| 2008/0027750 A1* | 1/2008 | Barkeloo | G06F 21/10 | 705/26.1 |
| 2008/0060080 A1* | 3/2008 | Lim | G06F 21/62 | 726/26 |
| 2008/0184125 A1* | 7/2008 | Suleiman | G06F 3/06 | 715/734 |
| 2008/0289031 A1* | 11/2008 | Anno | G06F 21/41 | 726/17 |
| 2008/0301351 A1* | 12/2008 | Lee | H04W 88/02 | 710/313 |
| 2009/0024674 A1* | 1/2009 | Gallagher | G06F 17/3023 | |
| 2009/0063697 A1* | 3/2009 | Fukao | H04L 67/06 | 709/232 |
| 2009/0064291 A1* | 3/2009 | Wahl | H04L 67/02 | 726/5 |
| 2009/0106271 A1* | 4/2009 | Chieu | G06F 17/30929 | |
| 2009/0132537 A1* | 5/2009 | Denton | G06F 21/604 | |
| 2009/0300079 A1* | 12/2009 | Shitomi | G06F 3/0605 | |
| 2009/0327904 A1* | 12/2009 | Guzak | G06F 3/0482 | 715/738 |
| 2009/0328171 A1* | 12/2009 | Bayus | G06F 21/6272 | 726/7 |
| 2010/0106709 A1* | 4/2010 | Imai | G06F 17/30091 | 707/713 |
| 2010/0153565 A1* | 6/2010 | Nayak | G06Q 10/06 | 709/229 |
| 2010/0174689 A1* | 7/2010 | Maeda | G06F 21/6218 | 707/694 |
| 2010/0287219 A1* | 11/2010 | Caso | G06F 17/30094 | 707/827 |
| 2010/0332611 A1* | 12/2010 | Kamijima | G06F 17/30165 | 709/212 |
| 2011/0047276 A1* | 2/2011 | Herr | H04L 63/10 | 709/227 |
| 2011/0066948 A1* | 3/2011 | Tsao | G06F 17/30893 | 715/739 |
| 2011/0209221 A1* | 8/2011 | Hanson | G06F 17/30265 | 726/26 |
| 2011/0219322 A1* | 9/2011 | Ramamurthy | H04N 21/252 | 715/764 |
| 2012/0005237 A1* | 1/2012 | Obata | G06F 9/45537 | 707/798 |
| 2012/0036161 A1* | 2/2012 | Lacapra | G06F 17/30194 | 707/781 |
| 2012/0124092 A1* | 5/2012 | Teranishi | G06F 21/604 | 707/783 |
| 2012/0222110 A1* | 8/2012 | Huang | H04L 43/028 | 726/22 |
| 2012/0331108 A1* | 12/2012 | Ferdowsi | H04L 67/06 | 709/219 |
| 2013/0066835 A1* | 3/2013 | Haubold | G06F 17/30171 | 707/640 |
| 2013/0166595 A1* | 6/2013 | Meketa | H04L 63/0815 | 707/783 |
| 2013/0239014 A1* | 9/2013 | Patil | G06F 3/0482 | 715/748 |
| 2013/0297653 A1* | 11/2013 | Chainani | G06F 17/30339 | 707/783 |
| 2013/0346718 A1* | 12/2013 | Meshchaninov | G06F 12/0623 | 711/164 |
| 2014/0033321 A1* | 1/2014 | Patidar | G06F 21/6218 | 726/27 |
| 2014/0040778 A1* | 2/2014 | Tsao | H04L 41/22 | 715/753 |
| 2014/0101212 A1* | 4/2014 | Maze | G06F 17/30203 | 707/827 |
| 2014/0215593 A1* | 7/2014 | Schwartz | H04L 12/5895 | 726/7 |

(56) References Cited

U.S. PATENT DOCUMENTS

2015/0134630 A1* 5/2015 Dudgeon .......... G06F 17/30371
           707/704
2015/0237109 A1* 8/2015 Ferdowsi ................ H04L 67/42
           709/203
2016/0180107 A1* 6/2016 Panchbudhe ......... H04L 63/102
           726/28

* cited by examiner

DOCUMENT MANAGEMENT SYSTEMS AND METHODS

RELATION TO PRIOR APPLICATIONS

This application is a continuation of U.S. patent application Ser. No. 13/646,541 filed Oct. 5, 2012 which issued as U.S. Pat. No. 8,924,443.

FIELD OF THE INVENTION

The inventions described herein relate to computer file management systems, more specifically to computer data and document files, allowing access in a secure and protected manner and allowing for rapid location and retrieval of such files.

BACKGROUND

Network appliances, such as a network attached storage (NAS) device, have been available for a while, but most if not all of these do not provide access to documents in a secure and protected manner or allow for rapid location and retrieval of such files. Instead, the NAS devices enable multiple computers to share the same storage space at once. Thus, these NAS devices implement a data-centric storage model but are more concerned about disk storage space availability than they are about file management.

Enterprise content management (ECM) systems, on the other hand, provide a formalized means of organizing and storing an organization's documents and related content. ECM is an umbrella term covering document management, web content management, search, collaboration, records management, digital asset management (DAM), work-flow management, capture and scanning Enterprise content management, as a form of content management, combines the capture, search, and networking of documents, usually together with digital archiving, document management, and workflow. As part of ECM systems, a document management system (DMS) is used to track and store electronic documents and/or images of paper documents, including a versioning capability (history tracking) The primary reason for a DMS over a file sharing system such as an NAS is to improve the sharing and auditing of business documents.

A problem is that as users continue to use their computer systems, the numbers of files created, accessed, modified, and lost grows. The benefits of data file management systems are well known but many, if not most, of the ECM document management systems are expensive, complicated, or both and most of the NAS devices are not adapted to provide true document management.

DRAWINGS

The various drawings supplied herein describe and are representative of exemplary embodiments of the invention and are described as follows.

DESCRIPTION OF PREFERRED EMBODIMENTS

Figure 1:
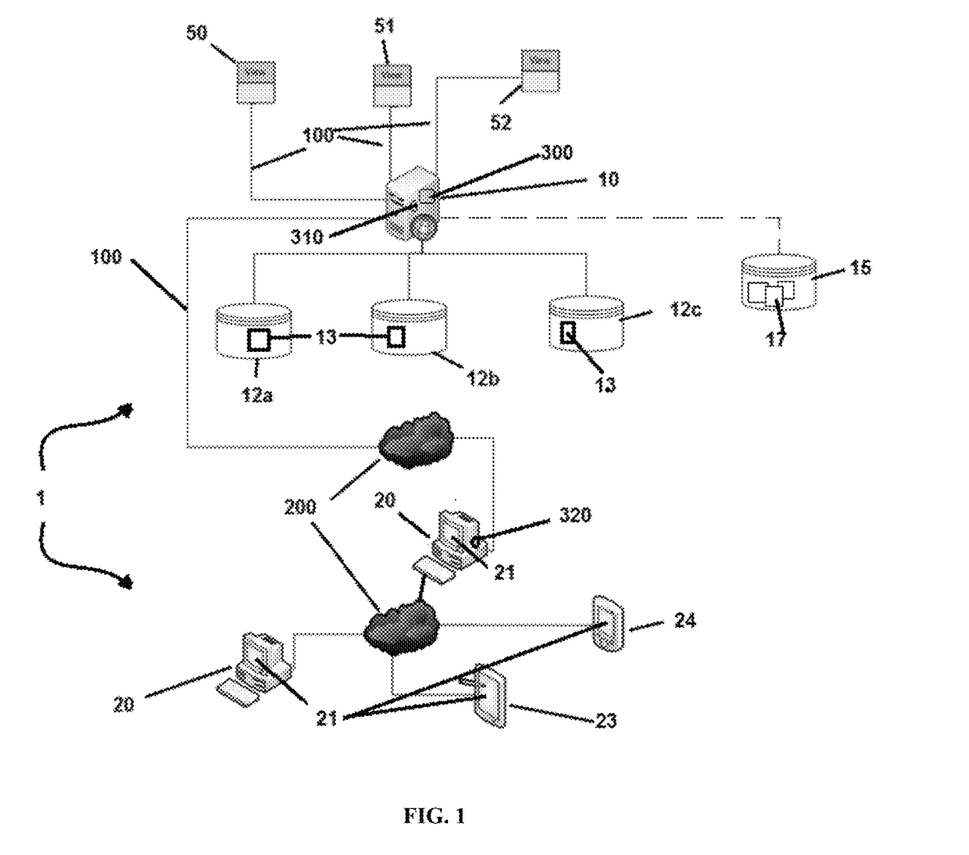
FIG. 1 is a schematic view of an exemplary system.

Referring to FIG. 1, system 1 comprises a network attached document management appliance, first computer 10, as well as second computer 20 and local area network (LAN) 100 to which each of first computer 10 and second computer 20 are operatively connected. Each of first computer 10 and second computer 20 further comprises a separate, immutable, queriable, unique identifier that can be used as a token, e.g. a CPU hardware ID or the like. In this way, first computer 10 has its own unique token as does second computer 20.

First computer 10 comprises data store 15, database management software 300, and, in some embodiments, server pipe service software 310. In most configurations, first computer 10 further comprises preconfigured database 12 (12a, 12b, 12c) comprising a preconfigured set of tables 13. Data store 15 is configured and adapted for storing files 17. A predetermined portion of data store 15 is accessible only by software operating in first computer 10 and may be further accessible to other software, e.g. to software in second computer 20, using security provided by the operating system executing in first computer 10. That security can also be used to further isolate and manage access to the predetermined portion of data store 15 by software executing in first computer 10. In certain embodiments, a portion of data store 15 may be generally accessible and first computer 10 may act as a file server as well as a document management system server. However, in each case, the predetermined portion of data store 15 is still accessible only by software operating in first computer 10 and still may be further accessible to other software, e.g. to software in second computer 20, using security provided by the operating system executing in first computer 10.

Second computer 20 comprises application software, e.g. word processors and the like, and, in some embodiments, client pipe service software 320. In certain embodiments, the application software may be specifically tailored to interface with first computer 10 and its software, in the manners described herein below. Access software is typically installed on second computer 20 where the access software is configured and adapted to communicate with first computer 10 when a file operation is desired by second computer 20 with respect to a file to be managed, as described herein below. As used herein, second computer 20 may be a traditional computer such as a desktop or laptop computer; a tablet; a smart device such as a smart phone; or any other unit having a processor and display.

For embodiments that include it, server pipe service software 310 is operatively in communication with database management software 300 and can directly access data store 15. Server pipe service software 310 is typically adapted and configured to communicate over local area network 100 using named pipe data transfer and operates server pipe 311 with a predetermined name such as one comprising the name of first computer 10. Similarly, client server service software 320 is adapted and configured to be operatively resident in second computer 20 and to communicate over local area network 100 using named pipe data transfer to and with pipe server service software 310. In most configurations, server pipe service software 310 is preconfigured with at least the token of first computer 10 and server pipe name 313 and client server service software 320 preconfigured with at least server pipe name 313.

In alternative embodiments, a process other than a pipe service may be used, e.g. an interprocess communication (IPC) server and client including TCP/IP based communication servers/clients. These processes may include distributed processes known as Component Object Model (COM) and/or distributed COM (DCOM), dynamic data exchange (DDE), remote procedure calls (RPC), and Windows Sockets as well as named pipes. As is known to those of ordinary skill in these arts, some technologies such as Windows Sockets may require having to assign a port for the local host server.

In the operation of selected embodiments, still referring generally to FIG. 1, in general users of system 1 request a file operation to be performed with respect to a managed folder and/or managed file 17. These file requests typically comprise a request to store file 17 at or retrieve file 17 from first computer 10. The file operation request may also comprise obtaining data related to file 17 to be transferred prior to transferring file 17 to or from first computer 10 and associating the obtained data with file 17 to be transferred. If the file operation request involves storing file 17 at first computer 10, the file operation request operation typically includes storing all or a portion of the obtained data in a searchable record associated with file 17 transferred in table 13 managed by database manager 300.

Each user may be further allowed to create a user taxonomy unique to the user, typically a hierarchical taxonomy separate from a set of global attributes. In these embodiments, each user may be allowed to associate a taxonomy member of the user taxonomy with either a desired managed folder, a desired managed folder item, or both.

A set of preconfigured, related tables 13 are created in database 12 which is managed by database manager 300. The set of related tables 13 typically comprise data regarding each managed folder and each managed folder item, e.g. a set of other folders and/or a set of files 17. Records may be added to set of related tables 13, where these records comprise data sufficient to identify the set of files 17 and/or other folder items having limited accessibility that are to be managed, e.g. file names, file types, client-matter identity associations, and the like, or a combination thereof. A set of managed folders is isolated from direct access by a user of the operating system of first computer 10 and/or second computer 20, such as by using the security system of the operating system. Over time, the managed folders are populated by the set of files 17 having limited accessibility that are to be managed.

A single physical file 17 may be designated as a linked file, in which case the same physical file can be made to appear to be associated with a set of folders, i.e. viewing the contents of Folder "B" may show that it contains File "A" even though File "A" is really located in Folder "A." A user with appropriate permissions may mark a file item as a linked file item, e.g. by having database manager 300 provide a linked file item attribute as part of the set of item attributes, and associate the linked file item with a set of managed folders. This linked file item will then be displayed as a member of each associated member of the set of managed folders, provided view privileges allow such display. A desired file operation may be performed against the linked file item irrespective of the associated managed folder except that deletion of the physical linked file item is allowed only if it is associated with a single managed folder.

A set of users can be created at system installation time but the creation can be at any time before and/or after installation as well. Each user may be assigned a set of permissions where the permissions may comprise a read permission, a write permission, a delete permission, a move permission, an import permission, an export permission, and a view permission, or the like, or a combination thereof, each of which can be to either allow the operation or deny the operation.

Figure 2:
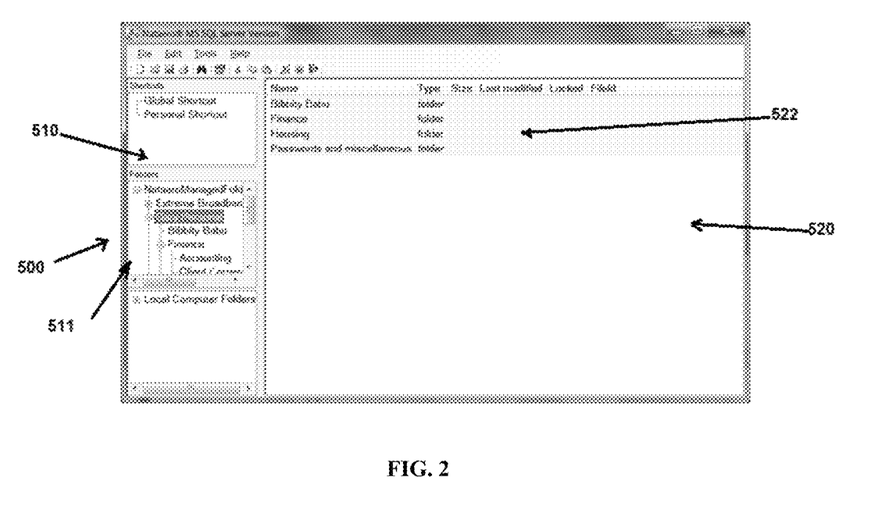
FIG. 2 is an exemplary browser view.

Referring additionally to FIG. 2, one way for a user to access the managed folders and files 17 is via browser display 500 shown on display screen 21 (FIG. 1) at second computer 20 (FIG. 1), where browser display 500 comprises a file item browsing form comprising folder panel 510 and file panel 520. Folder panel 510 comprises a list of managed folders in first predetermined portion 511 of browser display 500 and file panel 520 comprises a list of contents of a currently selected managed folder of the list of managed folders, if any, in second predetermined portion 522 of browser display 21. A user may select a managed folder visible in folder panel 510 to view a list of that managed folder's contents if the user has appropriate permissions for that folder and may then be allowed to request a file operation on a selected file item 15 associated with the selected managed folder, again if the user has appropriate permissions for that file. In addition, a user may locate a managed folder and/or file by using a searching form 600 (FIG. 7) which provides search criteria entries.

In certain embodiments, a system manager and/or a user can create a link or set of links to a client-matter related folder or subfolder. This shortcut can be presented to the user via an interface such as the browser interface in FIG. 2. In this manner, the user can rapidly access files for which the user has adequate permissions as opposed to either searching using search 600 form or using a browser-like interface such as browser form 500 to home in on those files.

Figure 7:
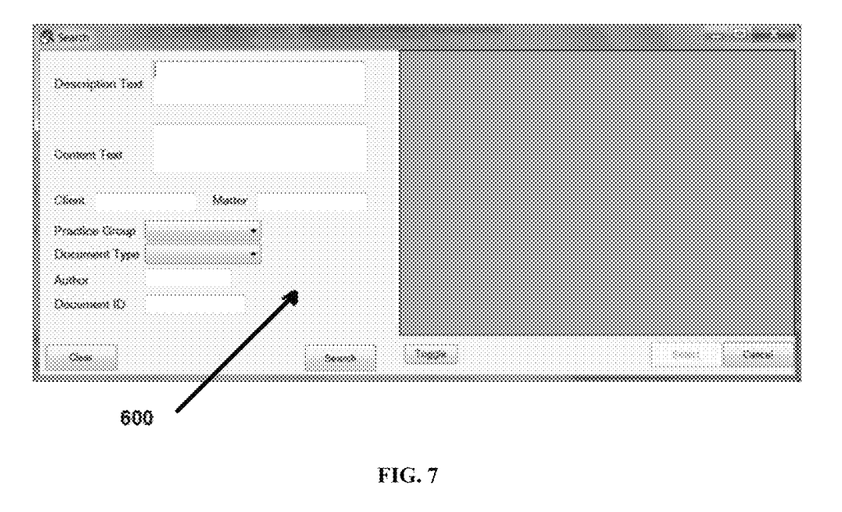
FIG. 7 is an exemplary search view.

Using either browser form 500 or search 600 form the user may optionally be presented with a set of filtering criteria and the managed file items displayed in the file panel are limited to those which meet the filtering criteria.

In any of these embodiments, data transfers between first computer 10 and second computer 20 may involve encrypting the data to be transferred, e.g. using server pipe service token 312, client pipe service software 320 token, or both as keys for encryption/decryption. The file operation may comprise a read request, a write request, a directory request, a file information request, a delete request, or the like, or a combination thereof. For example, the predetermined, specific file operation may comprise a request to store file 17 at first computer 10, and data related to file 17 to be stored at first computer 10 is obtained prior to transferring file 17 to first computer 10. Whether the data are obtained at first computer 10 or second computer 20, the obtained data are associated with the file to be stored at first computer 10 and stored in a searchable record associated with the file to be stored at first computer 10 in one or more tables 13 managed by database manager 300.

Additionally, data may be obtaining related to the data to be transferred prior to the data transfer and the obtained data associated with the data to be transferred. These obtained data may be stored in a searchable record associated with the data transferred in table 13 which managed by database manager 300.

Upon successful complete of the data transfer, one or more tables 13 controlled by database manager 300 are updated with a predetermined set of file data related to the data transfer. Updates of the data in tables 13 may be controlled by database manager 300 by creating a new record in table 13 if the file data do not currently exist in table 13 or updating an existing record which is associated with the file data in table 13 with a predetermined set of data.

Once the file operation is successfully completed, for file creations and/or updates first computer 10 can create file 17 with the file name at predetermined file location using the received data. If table 13 is not updated successfully or if file 32 is not created successfully, created file 17 is typically deleted.

In these various embodiments, text content, if any, may be extracted from the data in file 17 to be transferred and stored in a text searchable record associated with the data transferred in table 13 managed by database manager 300. These may be text that are associated with and/or embedded within file 17, e.g., a word processing, spreadsheet, presentation, email, or other files. The text content may be extracted from the data to be transferred prior to or after transferring the data. If prior to, the extracted text content may be part of in the data to be transferred. If after, text may be extracted at first computer 10 at one or more predetermined intervals.

In certain embodiments, the data to be transferred are encrypted by the sender, e.g. software executing in second computer 20, and decrypted by the receiver, e.g. software executing in first computer 10, using server pipe service token 312, client pipe service software 320 token, or a combination thereof as the encryption key or part of the encryption key.

In certain embodiments, managed folders, folder items, and their set of item attributes may be pre-existing and imported into system 1. Once imported, these managed folders, folder items, and their set of item attributes will no longer be accessible outside of first computer 10 without using system 1.

A set of item attributes from a set of global item attributes may be assigned to one or more managed folders, e.g. user access rights, read-only attributes, defaults, and the like, or a combination thereof. Each managed folder item may then also be associated with a subset of the set of item attributes and a set of searchable attributes associated with each managed folder item. For example, a user might want to find a set of folders associated with a specific client-matter or a set of folders associated with a specific practice group area or other user defined criterion.

Typically, a set of users is created during system installation such as when software modules (described below) are installed at second computer 20. Each user will have predetermined access to a set of managed folders and managed files. Each user may be assigned a set of permissions such as a read permission, a write permission, a delete permission, a move permission, an import permission, an export permission, and a view permission.

A user may be allowed to specify file versioning, either automatically or manually, where each version of a managed file comprises a physically separate instance of the versioned managed file. Users with adequate permission may also be allowed to specify where a versioned managed file is to be stored, e.g. data store 15, a data store local to second computer 20, a data store accessible over local area network 100, a data store accessible over wide area network 200, or the like, or a combination thereof. Users with adequate permission may be allowed to freeze a version of file 17, including a linked item version of file 17. If so desired, a new copy of the frozen file 17 is created with a new version identified for file 17 and the new copy of file 17 associated with a selected managed folder.

Users with appropriate permission may specify a set of managed folders or files for backup, including specifications of when and where backed up folders and files are to be stored, e.g. a data store local to second computer 20, a data store accessible over local area network 100, a data store accessible over wide area network 200, or the like, or a combination thereof. First computer 10 will then backup the folders and/or files according to the schedule of file item backups.

A set of file operations is captured in an audit table 13 in database 12. These may include requests for operations, actual operations (e.g. read, write, open, close, delete, move), and success/failure status indicators. For example, database 12 is updated to reflect the status of the file operation, e.g. if it was successful or not.

Several differing embodiments will be described below, each of which may further comprise one or more of the aspects described above.

Figure 3:
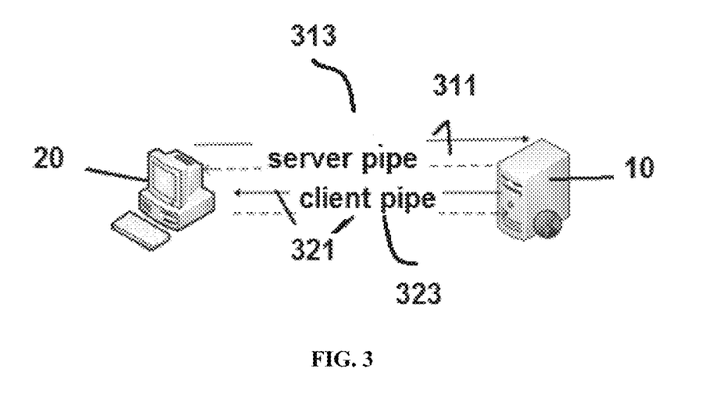
FIG. 3 is a schematic view of a first embodiment.

Referring to FIG. 1 and FIG. 3, in a first embodiment files 17 may be managed on a file server such as first computer 10 by initiating database manager 300 at first computer 100 operatively in communication with a data network 100, where first computer 10 comprises data store 15 which stores a set of files 17 having limited accessibility to second computer 20 via data network 100. As will be known to those of ordinary skill in these arts, data network 100 may comprise local area network 100, wide area network 200, a virtual network, a telecom network, and the like, or a combination thereof.

Files 17 may be made accessible to second computer 20, e.g. via data network 100, only through the use of a predetermined, specific user name and a predetermined, specific user password. The user name and user password are typically determined before an attempt is made to access files 17. In an embodiment, the user name and user password are determined from a login form. In other embodiments, the user name and user password are determined from either data within first computer 10 and/or second computer 20, data accessible via data network 100 such as Active Directory information, or the like, or a combination thereof.

First computer 10 initiates server pipe service software 310, either automatically after a triggering event, manually, or the like, or a combination thereof. Server pipe service software 310 is accessible, e.g. to second computer 20, over server named pipe 311 which comprises predetermined server pipe name 313. In typical embodiments, database manager 300 and server pipe service software 310 are separate processes operating in first computer 10.

Second computer 20 initiates client pipe service software 320, either automatically after a triggering event, manually, or the like, or a combination thereof. Second computer 20 uses client pipe service software 320 to request a connection via server pipe service software 310 to first computer 10 by using client pipe service software 320 to establish a connection to server pipe service software 310 using server named pipe 311. In a preferred embodiment, establishing this connection comprises sending server pipe service software 310 message 400 (FIG. 6) which comprises client pipe service token 322 which is specific to second computer 20. In certain embodiments, a predetermined set of user related data may be appended to message 400 prior to its being sent, e.g. a user identifier and a file identifier. Moreover, the user identifier may be required to be associated with sufficient permission to access data associated with the file identifier as part of validating the received client pipe service token 322 against the predetermined set of valid tokens.

Client pipe service token 322 is received by server pipe service software 310 over server named pipe 311 and the received client pipe service token 322 is then validated at first computer 10 against a predetermined set of valid client pipe service tokens 322. The received client pipe service token 322 is typically validated at first computer 10 by server pipe service software 310. The validation process may include a query session between server pipe service software 310 and database manager 300.

If received client pipe service token 322 is not validated, the connection over server named pipe 313 is terminated for that request from second computer 20. A subsequent request may be validated, either from second computer 20 or from another computer, depending on receipt of a valid client pipe service token 322.

If received client pipe service token 322 is validated by first computer 10, first computer 10 sends server pipe service token 312 to client pipe service software 320 over server named pipe 311, basically as an ACK, and waits for a further message 400 (FIG. 6) from client pipe service software 320. Client pipe service software 320 creates second pipe 321 with a new predetermined second pipe name 323 where second pipe name 323 is known to first computer 10, e.g. second pipe name 323 is based on and/or comprises client pipe service token 322. To help insure that second pipe 321 is created and operational, second computer 20 may create message 400 comprising server pipe service token 312 and send message 400 to server pipe service software 310 from client pipe service software 320 over either first pipe 311 or second pipe 321 to indicate that second pipe 321 is ready for communication and that second computer 20 is waiting for an acknowledgement message 400 from first computer 10.

Figure 6:
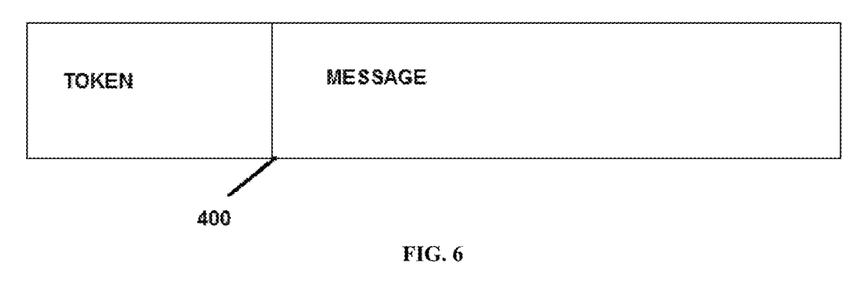
FIG. 6 is a box view of an exemplary message.

An indication of whether client pipe service software 320 desires to obtain data from server pipe service software 310 or provide data to server pipe service software 310 may be included as all or part of message 400 (FIG. 6). When message 400 comprises a desire to provide data to server pipe service software 310, second computer 20 may provide server pipe service software 310 with a file name to be used for file 17 to be created at first computer 10 using the provided data as well as provide server pipe service software 310 with data sufficient to identify a location at first computer 10 at which to create file 17. This message may comprise various additional data, including, by way of example and not limitation, the length of the file to be sent to the server so the server can verify it received all pertinent data.

Prior to creating file 17, first computer 10 may validate the file name and the predetermined file location, and only allowing creation of file 17 if the file name and the predetermined file location are validated. The validation may comprise a validation by server pipe service software 310.

First computer 10 sends an acknowledgement message which, if the request is to obtain a file, may comprise various additional data, including, by way of example and not limitation, the length of the file to be sent to the client so the client can verify it received all pertinent data. The message may comprise a "begin transmission" or "begin reception" message 400 (FIG. 6) sent to client pipe service software 320 from server pipe service software 310 which, upon being received by client pipe service software 320, triggers second computer 20 to initiate the desired file operation over second pipe 321, e.g. a data transfer to or from first computer 10. In this embodiment, all data are transferred using pipe I/O, but the messaging may be similar in more than this embodiment.

The predetermined, specific file operation may be trapped in a computer program operatively resident in second computer 20 when the computer program requests the predetermined, specific file operation, e.g. by adding software responsive to an event raised by the computer program to accomplish the predetermined, specific file operation. For example, trapping may be accomplished by a software module integrated into at least one of a computer operating system or the computer program responsive to an event raised by the computer program to accomplish the predetermined, specific file operation.

If the data transfer is completed successfully, the transferring computer sends a successful transfer message 400 (FIG. 6) between server pipe service software 310 and the client pipe service.

Figure 4:
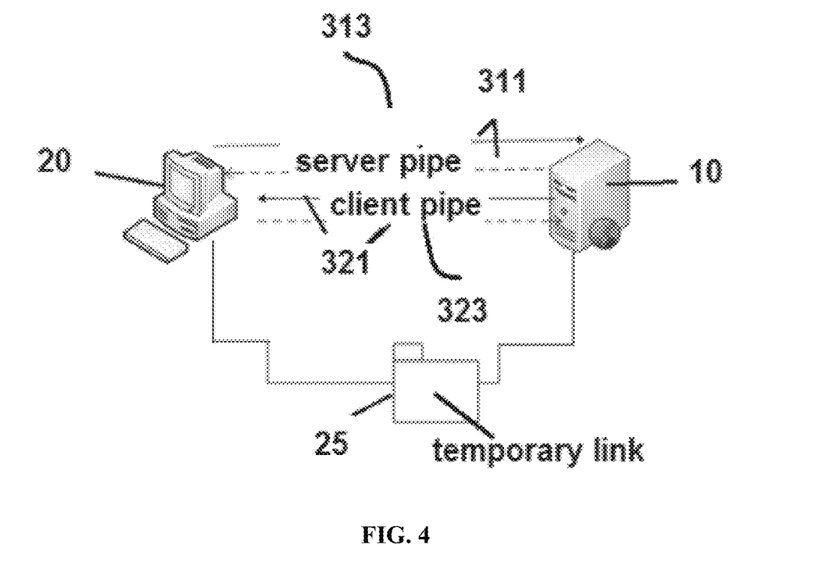
FIG. 4 is a schematic view of a second embodiment.

Referring now to FIG. 1 and FIG. 4, in a second embodiment files 17 accessible to a computer operating system are managed by isolating a set of managed folders at first computer 10 from direct access by a user of second computer 20. These managed folders comprise a set of managed files 17 associated with the managed folders, where the set can be empty. A set of item attributes may be assigned from a predetermined set of global item attributes to each managed folder and each managed folder populated with a set of managed folder items which may comprise files 17, folders, links to files 17 and/or folders, or the like, or a combination thereof. These item attributes may comprise read access, write access, deletion access, move access, export access, and the like, or combinations thereof. Each managed folder item may also be associated as well with a subset of the set of item attributes and with a set of searchable attributes for each managed folder item.

A software module is integrated into a software application at second computer 20, e.g. a word processing or email software application, and hooks into a predetermined set of software application events, allowing the file operation if the user has appropriate permissions to perform the file operation by trapping a file operation request made by the software module at second computer 20 to effect the file operation at the software application event level. The access software is adapted and configured to selectively and temporarily map the predetermined portion of data store 15 as temporary link 25 when the file operation is desired by second computer 20 with respect to a file to be managed. For example, the access software can set a logical route to a predetermined folder or set of folders resident in data store 15 and map that logical route to a drive designator, e.g. the "N:" drive, as temporary link 25.

If it is verified that the user has appropriate permissions to perform the desired file operation, a temporarily enabled secured logical path to first computer 10, temporary link 25, is created from second computer 20 and the file operation allowed over temporary link 25 to first computer 10, e.g. a temporary mapping of a predetermined folder at first computer 10 to a logical drive designator, e.g. "N:". Upon completion of the requested operation, temporary link is dissolved or otherwise removed.

In certain embodiments, creation of temporary link 25 comprises initiating server pipe service software 310 at first computer 10, where server pipe service software 310 is accessible over predetermined server named pipe 311. Server pipe service software 310 may be initiated on a more-or-less permanent, on demand, and/or periodic basis. Client pipe service software 320 is initiated at second computer 20, typically on demand, and a connection to first computer 10 by second computer 20 is requested by using client pipe service software 320 to establish a connection to server pipe service software 310 using server named pipe 311. Establishing this connection typically comprises sending message 400 (FIG. 6) comprising client pipe service token 322 to server pipe service software 310; receiving message 400 from client pipe service software 320 by server pipe service software 310; validating the received client pipe service token 322 at first computer 10 against a predetermined set of valid client pipe service tokens 322 typically created during system installation; and allowing creation of temporary link 25 only if the received client pipe service token 322 is validated.

In a version of this embodiment, a software application executing in second computer 20 first queries database manager 300 to determine if second computer 20 has adequate permission to perform a predetermined, specific file operation with respect to a file that is a member of the set of files having limited accessibility. If second computer 20 has adequate permission, second computer 20 initiates temporary link 25 to the set of files 17 having limited accessibility when the predetermined, specific file operation is requested at second computer 20.

Once temporary link 25 is established, second computer 20 performs the predetermined, specific file operation and software operative in either or both of first computer 10 and/or second computer 20 updates table 13 managed by database manager 300 with the completed status of the predetermined, specific file operation. In this embodiment, file transfers occur over temporary link 25 such as by using operating system file transfer methods.

Whether or not successful, upon completion of the predetermined, specific file operation, second computer 20 terminates temporary link 25.

Figure 5:
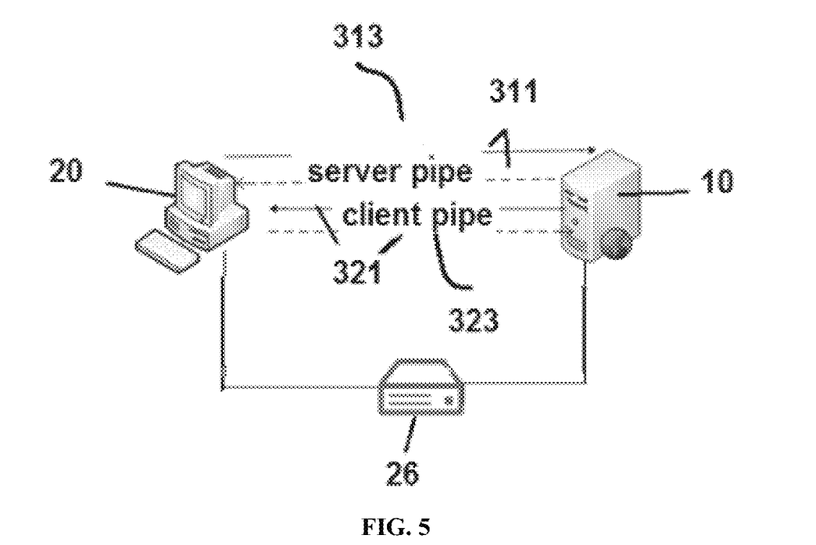
FIG. 5 is a schematic view of a third embodiment.

Referring now to FIG. 1 and FIG. 5, in a third embodiment, as opposed to the methods described above driver-based disk mapper 326 is initiated at second computer 20, where driver-based disk mapper 326 creates a mapped pseudo-disk drive 26 at second computer 20. For example, the user (and, by implication, software operative in second computer 20) may see drive "N:" at second computer 20 and the software executing in second computer 20 may operate as if drive "N:" is a physical drive, but drive "N:" is only accessible via driver-based disk mapper 326 to emulate a physical drive, e.g. mapped pseudo-disk drive 26.

Software executing at second computer 20 attempts a file operation on a file 17 of the set of files 17 having limited accessibility at second computer 20 via pseudo-disk drive 26, e.g. attempts to open file 17. Upon receipt of the file operation request, driver-based disk mapper 326 connects to server pipe service software 310 to establish whether or not second computer 20 is a valid, registered computer using message 400 (FIG. 6) which comprises client pipe service token 322. If second computer 20 is a valid, registered computer, driver-based disk mapper 326 queries database manager 300 to determine if second computer 20 has adequate permission to perform the specific, requested file operation with respect to file 17 of the set of files 17 having limited accessibility. If second computer 20 has adequate permission, driver-based disk mapper 326 allows the completion of the specific requested file operation between first computer 10 and second computer 20 via pseudo-disk drive 26, e.g. using computer operating system file transfer methods.

As opposed to the other methods described herein, pseudo-disk drive 26 is not temporary link 25 and allows for files 17 to be managed without having a software module integrated into an application at second computer 20. Thus, if a software module integrated into an application at second computer 20 does try to open a managed file 17 using pseudo-disk drive 26, that software module can identify itself to pseudo-disk drive 26, e.g. via a token or other message, and pseudo-disk drive 26 can then let the software module access managed file 17 as described herein. If, however, a file operation request is made through pseudo-disk drive 26 from other than a software module that is part of system 1, pseudo-disk drive 26 can present one or more forms to the user at second computer 20 to gather information required by system 1 for managed files, e.g. file description data, user description data, and the like. Pseudo-disk drive 26 can then perform many if not all of the functions required, as described herein, which normally would be performed by the software module that is part of system 1.

Further, as will be understood by those of ordinary skill in the software and computer networking arts, because pseudo-disk drive 26 represents a logical path, it can provide a secure path to so-called Cloud resources, e.g. servers 10 accessible over the Internet.

As with the other embodiments, table 13, managed by database manager 300, is updated with the completed status of the specific file operation.

As should be apparent to those of ordinary skill in the computer software arts, table 13 may be one or more tables 13; database 12 may be one or more databases 12a, 12b, 12c; file 17 may be an unmanaged file or a managed file, as context dictates (although usually file 17 indicates a managed file herein); and folder may be one or more folders or subfolders.

Further, rather than used named pipes, as mentioned above other processes may be substituted such as DCOM servers/clients and Windows Sockets servers/clients.

As noted above, application software, for example legal research software or eDiscovery software, may be modified and tailored specifically to interface with system 1 such that its file operations are also to be performed with respect to a managed folder and/or managed file 17 in the manners described in the various embodiments herein.

It will be understood that various changes in the details, materials, and arrangements of the parts which have been described and illustrated above in order to explain the nature of this invention may be made by those skilled in the art without departing from the principle and scope of the invention as recited in the appended claims.

What is claimed is:

1. A method of managing files on a document management file server, comprising:
   a. initiating database manager software at a first computer operatively in communication with a data network, the first computer comprising a set of managed folders and managed folder items associated with the set of managed folders, the managed folder items comprising a set of managed files andor other managed folders, the managed folders and their associated managed folder items resident in a first computer datastore, the managed folders and their associated managed folder items having limited accessibility from a second computer via the data network, the database manager software having access to a database comprising data regarding each managed folder and each managed folder item;
   b. querying the database manager software from the second computer operatively in communication with the data network to determine if the second computer has adequate permission to perform a predetermined file operation with respect to a file that is a member of the set of managed files having limited accessibility; and
   c. if the second computer has adequate permission:
      i. initiating a temporary link between the second computer and the first computer with respect to the set of managed files having limited accessibility when the predetermined file operation is requested by the second computer, the temporary link allowing direct access by the second computer only to that set of managed files having limited accessibility;

ii. performing the predetermined file operation;
iii. updating a table managed by the database manager software with an indication of a completed status of the predetermined file operation; and
iv. terminating the temporary link upon the completion of the predetermined file operation.

2. The method of managing files on a document management file server of claim 1, wherein the temporary link is created as a logical mapping of a drive designator at the second computer to a predetermined portion of a data store where the set of managed files is located.

3. The method of managing files on a document management file server of claim 1, wherein termination of the temporary link occurs whether or not the completion of the requested predetermined file operation was successful.

4. The method of managing files on a document management file server of claim 1, wherein initiating a temporary link further comprises:
   a. initiating a server pipe service at the first computer, the server pipe service accessible over a predetermined server named pipe;
   b. initiating a client pipe service at the second computer;
   c. requesting a server pipe connection to the first computer by the second computer by using the client pipe service to establish a connection to the first computer server pipe service using the server named pipe, the establishing comprising sending the server pipe service a client pipe service token specific to the second computer;
   d. receiving the client pipe service token by the server pipe service;
   e. validating the received client pipe service token at the first computer against a predetermined set of valid client pipe service tokens; and
   f. initiating the temporary link only if the received client pipe service token is validated.

5. The method of managing files on a document management file server of claim 4, further comprising encrypting the data transferred.

6. The method of managing files on a document management file server of claim 5, wherein the encryption uses at least one of a server pipe service token generated by the first computer or the client pipe service token.

7. The method of managing files on a document management file server of claim 1, further comprising trapping the predetermined file operation in a computer program operatively resident in the second computer when the computer program requests the predetermined file operation.

8. The method of managing files on a document management file server of claim 7, wherein the trapping is accomplished by a software module integrated into at least one of a computer operating system or the computer program.

9. The method of managing files on a document management file server of claim 1, further comprising:
   a. creating a set of related tables in the database, the set of related tables comprising data regarding each managed folder and each associated managed folder item;
   b. adding a predetermined set of records to the set of related tables, the predetermined set of records comprising data sufficient to identify the managed folders and their associated managed folder items;
   c. isolating a set of the managed folders from direct access by a user of an operating system operative in the second computer;
   d. assigning a set of item attributes from a set of global item attributes to each managed folder;
   e. associating each managed folder item associated with the managed folder with a subset of the set of item attributes and with a set of managed folders;
   f. associating a set of searchable attributes with each managed folder item;
   g. creating a set of users who will have access to managed folders and the managed folder items associated with each such managed folder;
   h. assigning a set of permissions to each user in the set of users, the permissions comprising a read permission, a write permission, a delete permission, and a view permission;
   i. performing a desired file operation against the managed folder item associated with the managed folder irrespective of the set of permissions associated with the managed folder; and
   j. allowing deletion of the managed folder item only if it is associated with a single managed folder.

10. The method of managing files on a document management file server of claim 9, further comprising:
    a. providing a shared file item attribute as part of the set of item attributes;
    b. allowing a user with appropriate permissions to mark a managed folder item as a shared file item, the shared file item comprising a link associating a first managed folder item with a second managed folder item where the first managed folder item is a physical managed folder item and the second managed folder item is a virtual managed folder item;
    c. allowing a user with appropriate permissions to associate the shared file item with a set of managed folders; and
    d. displaying the shared file item as a member of each associated member of the set of managed folders.

11. The method of managing files on a document management file server of claim 1, further comprising:
    a. allowing a user to freeze a version of a managed folder item;
    b. creating a new copy of the frozen managed folder item with a new version identified for the managed folder item; and
    c. associating the new copy of the frozen managed folder item with a selected managed folder.

12. The method of managing files on a document management file server of claim 1, further comprising:
    a. allowing a user with appropriate permissions to specify a set of managed folders or files for backup;
    b. allowing the user with appropriate permissions to specify a location for storing backed up folders and files; and
    c. performing the backup at the first computer according to a schedule of file item backups.

13. The method of managing files on a document management file server of claim 12, wherein the location comprises at least one of a local data store, a local area network data store, and a wide area network data store.

14. The method of managing files on a document management file server of claim 1, further comprising:
    a. allowing a user to specify file versioning, for managed folder items comprising a managed folder file item, each version of a managed folder file item comprising a separate instance of the versioned managed folder file item; and
    b. allowing a user to specify where a versioned managed folder file item is to be stored in a data store, the data store comprising at least one of a local data store, a local area network data store, and a wide area network data store.

15. The method of managing files on a document management file server of claim 1, further comprising:
   a. presenting a user with a set of filtering criteria in a displayed file panel;
   b. allowing the user to select a subset of the set of filtering criteria; and
   c. limiting the managed folder items displayed in the displayed file panel to those which meet the selected subset of filtering criteria.

16. The method of managing files on a document management file server of claim 1, further comprising allowing a user to locate a managed folder by presenting the user with a folder searching form, allowing the user to enter search criteria via the folder searching form, and using the entered search criteria from the folder searching form to locate managed folders meeting the search criteria.

17. The method of managing files on a document management file server of claim 1, further comprising:
   a. allowing a user to locate a managed file in a managed folder by presenting the user with a file item searching form;
   b. allowing the user to enter search criteria via the file item searching form; and
   c. using the entered search criteria from the file item searching form to locate managed files meeting the search criteria.

18. The method of managing files on a document management file server of claim 1, where the predetermined file operation comprises a request to store a file at the first computer, further comprising:
   a. obtaining data related to the file to be stored at the first computer prior to transferring the file to the first computer;
   b. associating the obtained data with the file to be stored at the first computer; and
   c. storing the associated obtained data in a searchable record associated with the file to be stored at the first computer in a table managed by the database manager software.

19. The method of managing files on a document management file server of claim 18, further comprising:
   a. extracting text content from the file to be stored at the first computer; and
   b. storing the extracted text content in a text searchable record associated with the file to be stored at the first computer in a table managed by the database manager software.

\* \* \* \* \*